US012704473B2

(12) United States Patent
Mudger et al.

(10) Patent No.: US 12,704,473 B2
(45) Date of Patent: Aug. 11, 2026

(54) DEFECT DETECTION OF EXTRUDED STRIP

(71) Applicant: The Steelastic Company, LLC, Cuyahoga Falls, OH (US)

(72) Inventors: Jacob James Mudger, Salem, OH (US); Daniel Duane Hawk, Akron, OH (US)

(73) Assignee: The Steelastic Company, LLC, Cuyahoga Falls, OH (US)

( * ) Notice: Subject to any disclaimer, the term of this patent is extended or adjusted under 35 U.S.C. 154(b) by 417 days.

(21) Appl. No.: 18/220,713

(22) Filed: Jul. 11, 2023

(65) Prior Publication Data

US 2024/0019388 A1 Jan. 18, 2024

Related U.S. Application Data

(60) Provisional application No. 63/388,514, filed on Jul. 12, 2022.

(51) Int. Cl.
*G01N 25/72* (2006.01)
*G01J 5/00* (2022.01)

(52) U.S. Cl.
CPC ...... *G01N 25/72* (2013.01); *G01J 2005/0077* (2013.01)

(58) Field of Classification Search
CPC ......................... G01N 25/72; G01J 2005/0077
USPC ............................................. 374/4, 57, 124
See application file for complete search history.

(56) References Cited

U.S. PATENT DOCUMENTS

2002/0166970 A1* 11/2002 Komulainen ........ D21G 9/0036 250/340
2013/0120561 A1* 5/2013 Heintze .................. G01N 25/72 348/135
2018/0202954 A1* 7/2018 Möller .................... B05C 13/00

FOREIGN PATENT DOCUMENTS

DE 102010054278 A1 * 6/2012 ......... G01B 11/0625
EP 3307512 B1 * 11/2021 ............. G01N 25/72
JP 2015071276 A * 4/2015
KR 10-2011-0056850 A 5/2011
WO 2016/048830 A1 3/2016
WO WO-2022073844 A1 * 4/2022 ........... G06T 7/0002

OTHER PUBLICATIONS

Translation of WO2022/073844A1.*

(Continued)

*Primary Examiner* — Mirellys Jagan
(74) *Attorney, Agent, or Firm* — Shook, Hardy & Bacon L.L.P.

(57) ABSTRACT

A defect detection system and method for detecting the presence of a defect in an extruded strip can include various elements. In examples, a thermal imagining sensor is used to detect a plurality of surface temperatures on a surface of the extruded strip. A processing unit is configured to generate a thermal map of an area of the surface of extruded strip. The processing unit is further configured to determine whether the plurality of surface temperatures are outside a tolerance range, indicating the presence of a defect in the extruded strip. Detecting a defect during the extrusion process can help achieve the goal of reducing manufacturing waste and increasing quality control.

25 Claims, 4 Drawing Sheets

(56) References Cited

OTHER PUBLICATIONS

EP Communication received for European Application No. 23750847.8, mailed on Feb. 19, 2025, 3 pages.

International Search Report and Written Opinion received for PCT Patent Application No. PCT/US2023/027492, mailed on Nov. 8, 2023, 12 pages.

* cited by examiner

DEFECT DETECTION OF EXTRUDED STRIP

CROSS-REFERENCE TO RELATED APPLICATIONS

This application claims the priority benefit of U.S. Application No. 63/388,514 (filed Jul. 12, 2022), which is incorporated herein by reference in its entirety.

TECHNICAL FIELD

This application relates to extruded strip inspection, and in particular, a system and method for detecting a defect in an extruded strip.

BACKGROUND

Extruded strips, such as extruded cap strips, are often used for the construction of automobile and other vehicle tire assemblies. The process of manufacturing an extruded cap strip requires the joining of a rubber material and a plurality of cords. The rubber material is generally formed as a layer with uniform thickness surrounding the plurality of cords, and the cords are generally linearly continuous. When the rubber material is either too thin or too thick, or a cord is no longer continuous when joined with the rubber material, a defect may be present in the extruded cap strip.

Prior approaches to detect a defect of an extruded cap strip include use of a general-purpose two-dimensional camera to detect surface contrast, a three-dimensional camera to detect surface structures, a sensor mounted to spools feeding the plurality of cords to detect rotation of the spool, a sensor mounted to spools of the plurality of cords to detect a broken cord, or an x-ray device to detect internal structures and defects. These prior defect detection systems have several drawbacks. For example, such systems may be unable to detect broken cords unless the cords are made of a metallic material or of a certain color, or they may be unable to detect missing rubber material. Additionally, such systems may be limited by significant implementation or operation costs or health hazards. The embodiments described in this application address these shortcomings.

BRIEF DESCRIPTION OF THE FIGURES

The embodiments discussed herein may be better understood with reference to the following drawings and description. The components in the figures are not necessarily to scale.

DETAILED DESCRIPTION

Figure 1:
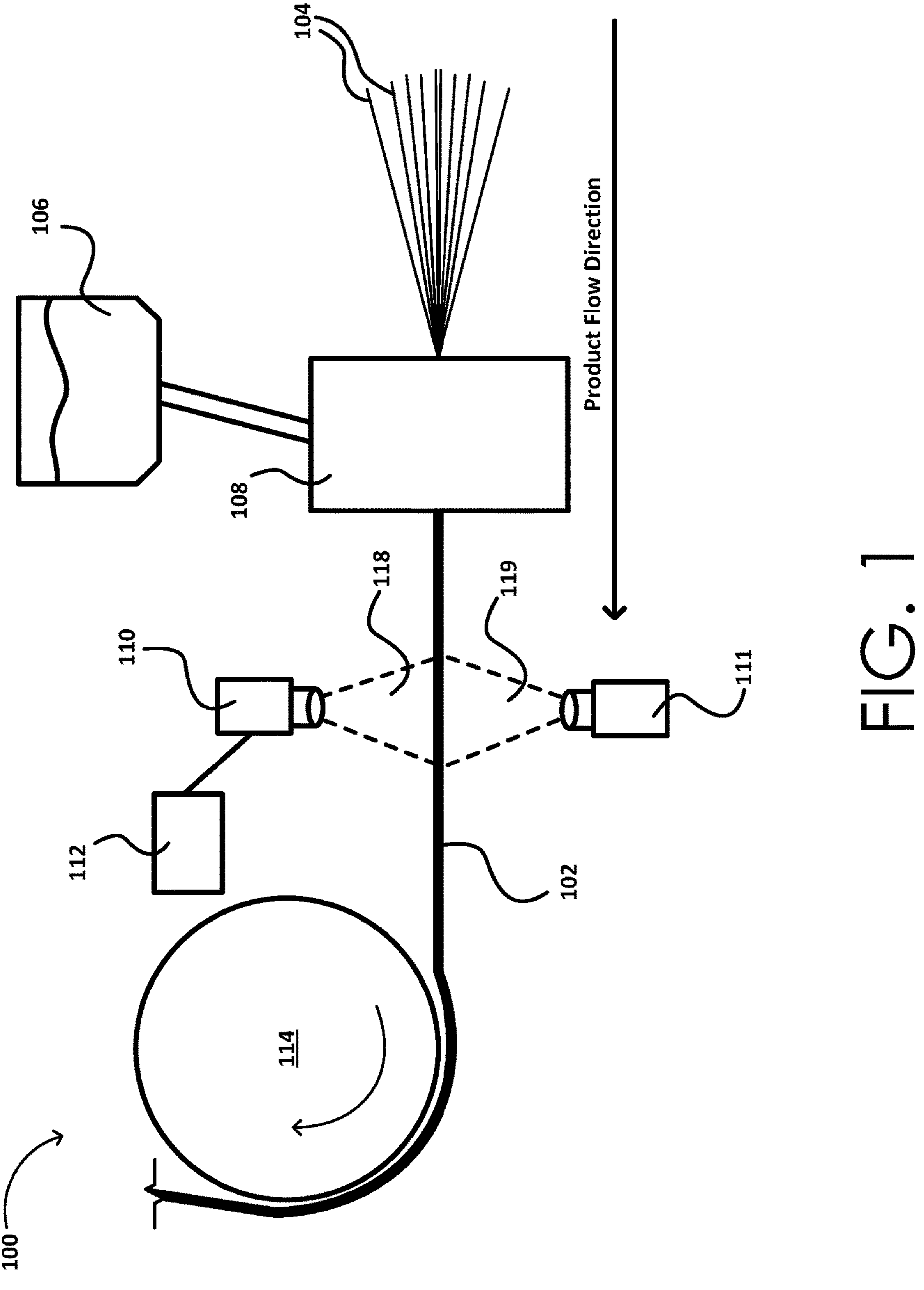
FIG. 1 is a schematic of a portion of a system for detecting defects associated with an extruded strip in accordance with examples of the present disclosure.

Various aspects are described below with reference to the drawings in which like elements generally are identified by like numerals. The relationship and functioning of the various elements of the aspects may be better understood by reference to the following detailed description. However, aspects are not limited to those illustrated in the drawings or explicitly described below, and the claims and subject matter described herein also include equivalent subject matter and inherent subject matter. It also should be understood that the drawings are not necessarily to scale, and in certain instances details may have been omitted that are not necessary for an understanding of aspects disclosed herein, such as conventional fabrication and assembly.

Figure 2:
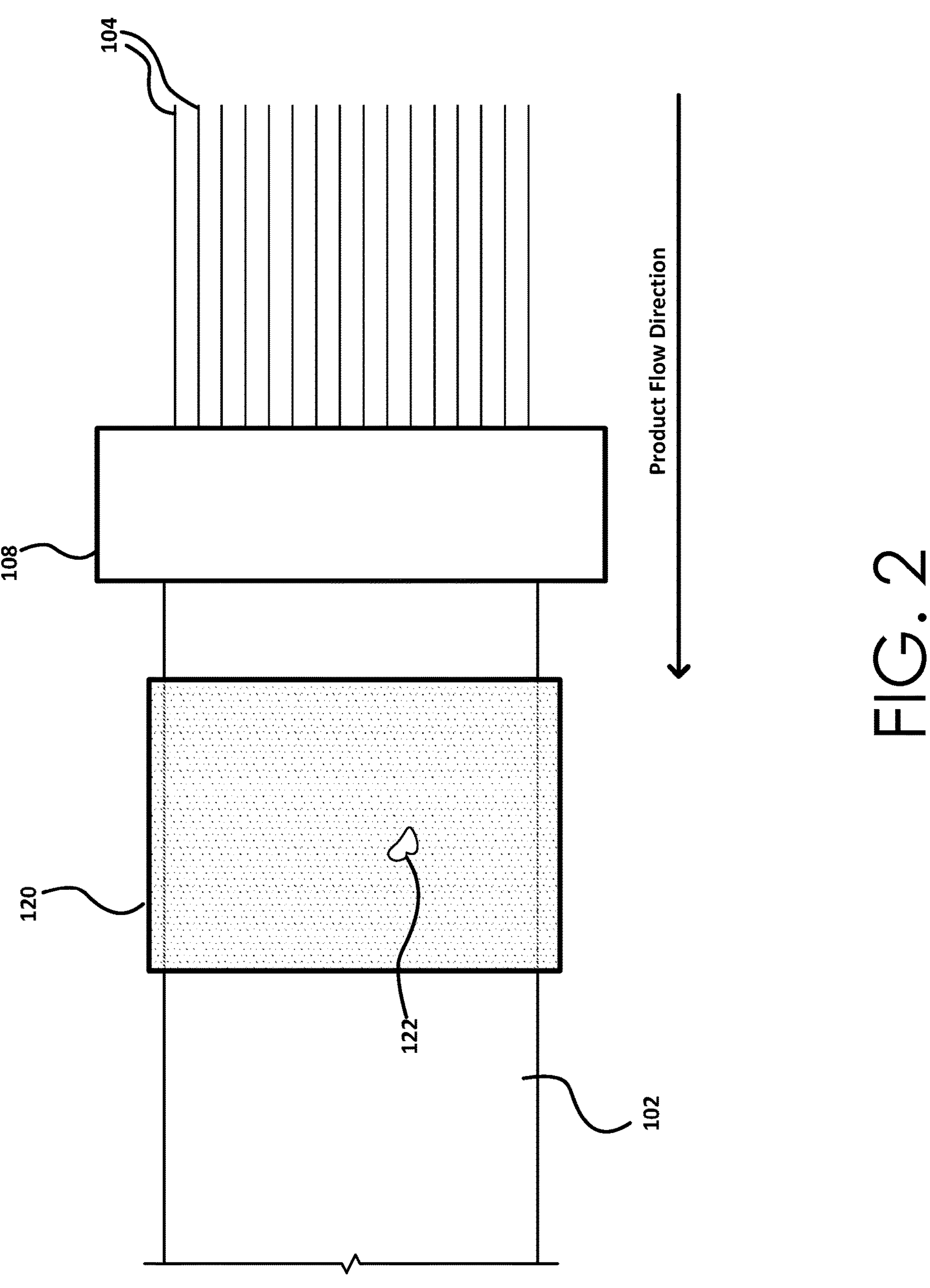
FIG. 2 is another schematic of the system of FIG. 1.

FIGS. 1 and 2 depict various features and aspects of a defect detection system 100. FIG. 1 shows a side view of a portion of the defect detection system 100. FIG. 2 shows a top view of a portion of the defect detection system 100. The extruded strip 102 may be, for example, a tire cap strip. A tire cap strip can be used in the production of automobile or other vehicle tires to increase efficiency in the production process and add strength to the tires. The defect detection system 100 may be used to detect a defect in an extruded strip 102 resulting from an abnormality in the manufacturing process. A tire cap strip is described in this disclosure as an example. The system 100 can detect defects in any other similar strip material (e.g., extruded strip of material).

As depicted in FIGS. 1 and 2, in an example manufacturing system, the extruded strip generally moves from right to left. A drive mechanism 114 rotates in a clockwise direction, as depicted in FIG. 1, pulling the extruded strip 102, so that it may be stored or transferred to the next step in the manufacturing process of the extruded strip 102.

Extruded strip 102 is formed by joining a rubber material 106 and a plurality of cords 104, where the cords 104 are made of a different material than the rubber material 106 (e.g., a metal material, polymer material, etc.). Notably, strips formed of other materials (e.g., other than rubber and/or metal) are also contemplated, but a rubber material 106 is described throughout this specification for purposes of description.

As depicted in FIG. 2, the plurality of cords 104 can be separated by a generally uniform distance, and non-uniform distances are also contemplated. This creates a generally uniform density, or other desired densities, of the plurality of cords 104 surrounded by the rubber material 106. As the drive mechanism 114 rotates, a strip extruder 108 uses heat and pressure to extrude the rubber material 106 onto the plurality of cords 104. Strip extruder 108 may be an extrusion die head. The extrusion die head may form a variety of shapes and sizes of extruded strip 102. The plurality of cords 104 provide sufficient rigidity to the extruded strip 102 such that no additional support, for example, a conveyor belt, is required. In some examples, the system 100 can include a conveyor belt. Drive mechanism 114 pulls extruded strip 102 from strip extruder 108, with the plurality of cords 104 providing rigidity and strength, so that extruded strip 102 may be stored or transferred to the next step in the manufacturing process.

After passing through the strip extruder 108, the extruded strip 102 can in some instances have a generally even coating of rubber material 106 surrounding the plurality of cords 104. The thickness of the rubber material 106 surrounding the plurality of cords 104 may depend on the dimensions and specifications of the strip extruder 108. The thickness of the rubber material 106 surrounding the plurality of cords 104 may also vary depending on the specific type of rubber material used to manufacture extruded strip 102. The thickness of the rubber material 106 surrounding the plurality of cords 104 may be chosen to conform with final manufacturing specifications of extruded strip 102.

In the absence of a defect, the extruded strip 102 includes all of the plurality of cords 104 prior to the strip extruder 108 present in a generally uniform density and continuous throughout the length of the extruded strip, surrounded by a generally uniform layer of the rubber material 106.

In some cases (e.g., based on manufacturing variations, irregularities, errors, etc.), defects may be present in extruded strip 102. For example, extruded strip 102 may include an absence of rubber material 106 surrounding a portion of the plurality of cords 104. Accordingly, one or more of the plurality of cords 104 may not be surrounded by any rubber material 106. Alternatively, one or more of the plurality of cords 104 may be surrounded by a non-uniform layer of rubber material 106. A non-uniform layer can include a first portion of the rubber material 106 that is included in the extruded strip 102 and that includes one or more properties different from a second portion of the rubber material also in the extruded strip (e.g., the second portion being near to or adjacent to the first portion). Examples of different properties can include different thickness, different surface finish (e.g., smoother, rougher, etc.), and the like. A defect may also be present in extruded strip 102 due to one or more plurality of cords 104 being damaged, missing, or broken, i.e., discontinuous or damaged along the length of the extruded strip 102.

In order to detect defects present in the extruded strip 102, the defect detection system 100 includes a thermal imaging sensor 110. The thermal imaging sensor 110 can operate by measuring the thermal radiation of extruded strip 102. The thermal imaging sensor 110 is electrically connected to a processing unit 112. The thermal imaging sensor 110 is positioned to detect a plurality of surface temperatures on a surface of the extruded strip as the extruded strip 102 exits the strip extruder 108. As depicted in FIG. 1, the thermal imaging sensor 110 has a field of view 118 of the extruded strip 102. The field of view 118 corresponds generally to an area 120 of the surface of the extruded strip 102, as depicted in FIG. 2.

The thermal imaging sensor 110 is configured to detect a plurality of surface temperatures on a surface of extruded strip 102. As discussed previously, extruded strip 102 is formed by joining a rubber material 106 and a plurality of cords 104. In order to properly extrude rubber material 106 to surround the plurality of cords 104, prior to exiting the strip extruder 108, the rubber material 106 is heated to an elevated temperature. By way of non-limiting example, rubber material 106 may be approximately 95-100 degrees Celsius in some manufacturing processes. By heating the rubber material 106 to an elevated temperature, a proper flow of the rubber material 106 out of the strip extruder 108 can be obtained. The plurality of cords 104 are maintained at a relative temperature substantially lower than the rubber material 106 (e.g., at least 20 degrees Celsius lower, such as about 50 degrees Celsius lower). For example, the plurality of cords 104 may be a temperature similar to the surrounding manufacturing environment. Optionally, the plurality of cords 104 may be temperature controlled to a specific temperature, including a temperature below the surrounding manufacturing environment. The plurality of cords 104 are at a temperature lower than the rubber material 106 prior to being joined.

Because of the elevated temperature of the heated rubber material 106 and the relatively lower temperature of the plurality of cords 104, a temperature differential between the two materials is present. As the extruded strip 102 exists the strip extruder 108, the heated rubber material 106 and the relatively lower temperature of the plurality of cords 104 begin to approach an equilibrium temperature. Approaching an equilibrium temperature here is used to refer to the temperature of the extruded strip 102 approaching a generally uniform temperature, i.e., the rubber material 106 and the plurality of cords 104 approaching thermal equilibrium, and not necessarily that extruded strip 102 approaches thermal equilibrium with the surrounding manufacturing environment. The equilibrium temperature of extruded strip 102 may generally be around or below 95 Celsius. Temperatures in this range aid the vulcanization process of rubber material 106. The equilibrium temperature depends on a variety of factors, including, but not limited to, the amount of rubber material 106 extruded out of strip extruder 108, the number of the plurality of cords 104, the thermal conductivity properties of the rubber material 106 and the plurality of cords 104.

The thermal imaging sensor 110 is generally positioned along the product flow direction at a point after extruded strip 102 exits strip extruder 108. In this way, the thermal imaging sensor is positioned at a location where the joining of the plurality of cords 104 and rubber material 106 forming extruded strip 102 begin to approach an equilibrium temperature, but such equilibrium temperature has not yet been reached. Also, the thermal imaging sensor 110 is positioned to detect a plurality of surface temperatures on a surface of the extruded strip 102 (e.g., with a detection field facing such surface).

The thermal imaging sensor 110 may be positioned perpendicular to the product flow direction in a variety of different locations after the strip extruder 108. In one example, the thermal imaging sensor 110 is positioned above a top surface of the extruded strip 102, as depicted in FIG. 1. In another example, the thermal imaging sensor 110 is positioned below a bottom surface of the extruded strip 102. The thermal imaging sensor 110 is generally positioned so that it may view at least a portion of the surface of the extruded strip 102.

The defect detection system 100 may also include multiple thermal imaging sensors 110. In one example, a first thermal imaging sensor 110 may be positioned above a top surface of the extruded strip 102 with field of view 118, and a second thermal imaging sensor 111 may be positioned below a bottom surface of the extruded strip 102 with field of view 119.

In another example, a first thermal imaging sensor 110 and a second thermal imaging sensor 111 may both be positioned above a top surface of the extruded strip 102.

In some examples, the first thermal imaging sensor 110 and the second thermal imaging sensor 111 may both be positioned below a bottom surface of the extruded strip 102.

In such configurations where multiple imaging sensors are on a same side of the extruded strip 102, the first imaging sensor 110 may be positioned to view a first portion of the surface of the extruded strip 102, and the second thermal imaging sensor 111 may be positioned to view a second portion of the surface of the extruded strip 102.

Alternatively, the first thermal imaging sensor 110 and second thermal imaging sensor 111 may be positioned to at least partially view an overlapping, or a same, portion of the surface of the extruded strip 102.

In examples, one or more thermal imaging sensors 110 can be positioned above the top surface, below the bottom surface, and any and all combinations thereof.

The thermal imaging sensor 110 is electrically connected to the processing unit 112. In some examples, the second thermal imaging sensor 111 is also electrically connected to processing unit 112. In other examples, thermal imaging sensor 111 is electrically connected to a second processing unit. The processing unit 112 may be a microprocessor, microcontroller, computer, manufacturing control system, vision controller, other device capable of processing data, or any other suitable device. The processing unit 112 may be included in the thermal imaging sensor 110, or it may be separate from the thermal imaging sensor 110 as depicted in FIG. 1.

As the extruded strip 102 passes the field of view 118 of the thermal imaging sensor 110, the thermal imaging sensor 110 is configured to detect a plurality of surface temperatures on the surface of the extruded strip 102. The plurality of surface temperatures may be detected for example, as a single value, or a range of values, e.g., a range of 2 degrees Celsius.

Based on the plurality of surface temperatures detected by the thermal imaging sensor 110, the processing unit is configured to generate a thermal map of the extruded strip 102. This thermal map may generally correspond to an area 120 of the extruded strip 102 that is within the field of view 118 of the thermal imaging sensor 110. The area 120 may be a defined length of a portion of the extruded strip 102 and a defined portion, or the whole, width of extruded strip 102. As the extruded strip 102 is pulled by the drive mechanism 114, the area 120 of the extruded strip 102 is constantly changing. Thus, the thermal map generated by the processing unit may be updated at periodic intervals as the extruded strip 102 exits the strip extruder 108.

The generated thermal map, which may exist in two dimensions, may include a series of data points. The first dimension of the thermal map may include a series of data points corresponding generally corresponding to a portion of the length of extruded strip 102. The second dimension of the thermal map may include a series of data points corresponding to a portion, or the whole, of the width of extruded strip 102. The series of data points along a portion of the length and the width of extruded strip 102 may thus generate a two-dimensional array (e.g., a map), of the temperature at various points of the area 120 of the extruded strip 102. Each value of the two-dimensional array may correspond to a temperature at a specific location of the extruded strip 102.

In addition to being configured to generate the thermal map of extruded strip 102, processing unit 112 may also be configured to perform a number of processing functions of the plurality of surface temperatures of the extruded strip 102. For example, processing unit 112 may be configured to filter the thermal image, i.e., the plurality of surface temperatures, to reduce possible noise in the thermal image detected by the thermal imaging sensor 110. Processing unit 112 may also be configured to smooth the plurality of surface temperatures to reduce possible noise in the plurality of surface temperatures detected by the thermal imaging sensor 110.

Processing unit 112 may also be configured to calculate a variety of thermal metrics based on the thermal map of extruded strip 102. Based on the calculated metrics of the thermal map, the processing unit 112 may detect the presence and/or location of a defect 122 of extruded strip 102. The defect may be due to a damaged or missing cord, or may be due to missing rubber material.

In some examples, processing unit 112 may calculate a temperature differential between the data points in the thermal map and the average. In some examples, processing unit 112 may calculate whether the temperature at a specific point falls outside of a specific range, standard deviation level, or other tolerance range. The temperature falling outside of the tolerance range may indicate a defect in the extruded strip 102. Whether the temperature is higher or lower than the tolerance range may indicate the type of defect present in the extruded strip 102. For example, if the temperature is below the tolerance range, that may indicate there is an absence of rubber material 106 present in extruded strip 102 because the rubber material 106 is at an elevated temperature relative to the plurality of cords 104 prior to the strip extruder 108. This may happen when rubber material 106 is flowing improperly through strip extruder 108. At locations of the extruded strip where there is missing rubber material, the temperature at a point at or near the location of the missing rubber material would be lower than it otherwise would be if there was a sufficient amount of rubber material. As a result, the temperature at a point at or near the location of the missing rubber material would be lower than the tolerance range. This may represent a defect present in extruded strip 102.

Similarly, if the temperature is above the tolerance range, that may indicate that one or more of the plurality of cords 104 are damaged or missing from extruded strip 102 because the plurality of cords 104 are at a lower temperature relative to the rubber material 106 prior to the strip extruder 108. At locations of the extruded strip where there is broken or missing cord, the temperature at a point at or near the location of the broken or missing cord would be higher than it would be if there was a continuous cord because the relatively lower temperature cord is not present to absorb the heat of the rubber. As a result, the temperature at a point at or near the location of the broken or missing cord would be higher than the tolerance range. This may represent a defect present in extruded strip 102. In some examples, a temperature above the tolerance range can also represent a thicker deposit of rubber (relative to the surrounding portions of the extruded strip 102), which can also represent a defect.

Processing unit 112 may also be configured to determine that there are multiple defects in extruded strip 102. For example, processing unit 112 may configured to determine that at a first location of extruded strip 102 the temperature is higher than the tolerance range, indicating a damaged, broken, or missing cord, and at a second location of extruded strip 102 the temperature is lower than the tolerance range, indicating an absence of rubber material. As another example, processing unit 112 may be configured to determine that at two separate locations of extruded strip 102 the temperature is above the tolerance range, indicating multiple damaged, broken, or missing cords of extruded strip 102.

Processing unit 112 may be configured to determine the location, shape and/or the size of the defect. For example, based on the temperature at different points of the thermal map relative to other points of the thermal map of extruded strip 102, processing unit 112 may be configured to determine where the defect begins and ends along the product flow direction of extruded strip 102. Processing unit 112 may also be configured to determine a width, i.e., the distance perpendicular to the product flow direction, of the defect. Processing unit 112 may also be configured to determine the shape of the defect based on the determined temperature relative to other points of the thermal map of extruded strip 102.

The processing unit 112 may be configured to communicate with one or more of the devices in defect detection system 100. For example, if processing unit 112 determines that there is a defect present in extruded strip 102, processing unit 112 may communicate with the drive mechanism 114 to stop pulling extruded strip 102 or otherwise interrupt or interfere with a manufacturing function. This may stop the manufacturing process of extruded strip 102. Stopping production of extruded strip 102 that includes a defect can help prevent excess manufacturing waste. It also permits an operator to address the presence of a defect in extruded strip 102, correct the error, and return to normal production of extruded strip 102.

The processing unit 112 of the defect detection system 100 may also be configured to communicate with one or more external devices. For example, if the processing unit 112 determines that there is a defect present in the extruded strip 102, the processing unit 112 may communicate with external devices, such as a feed hopper of rubber material 106, or one or more spools feeding the plurality of cords 104. This may stop the manufacturing process of the extruded strip 102. Stopping production of extruded strip 102 which includes a defect prevents excess manufacturing waste. It also permits an operator to address the presence of a defect in the extruded strip 102, correct the error, and return to normal production of extruded strip 102.

The defect detection system 100 may further include a data storage device electrically connected to the processing unit 112. The data storage device may be configured to store the thermal map, calculated metrics and/or the presence of a defect of the extruded strip. This permits traceability and/or historical recordkeeping of data generated by processing unit 112. The data storage device may be local, i.e., located at or near the processing unit 112, or the data storage device may be a remote storage device, i.e., located at a different location of the manufacturing facility or on a cloud server. The data storage device may be any type of memory device, including but not limited to, random access memory (RAM), read only memory (ROM), hard-disk drive, solid-state drive, optical disk drive, and/or cloud storage.

The defect detection system 100 may include an audio output device electrically connected to the processing unit 112. The audio output device may be configured to generate an audible tone when the processing unit 112 detects a defect in the extruded strip 102. The audio output device may be a horn, speaker, siren, or other similar device configured to generate an audible tone. The audio output device serves to audibly alert a manufacturing operator that a defect has been detected in extruded strip 102 by the defect detection system 100.

The defect detection system 100 may include a light-emitting device electrically connected to the processing unit. The light-emitting device may be configured to generate a visual indicator when the processing unit 112 detects a defect in the extruded strip 102. The light-emitting device may be a light-emitting diode, incandescent lamp, halogen lamp, fluorescent lamp, or other similar device configured to generate a visual indicator. The light-emitting device serves to visually alert a manufacturing operator that a defect has been detected in extruded strip 102 by the defect detection system 100.

In another example, the defect detection system 100 includes a marking device electrically connected to the processing unit 112. The marking device may be configured to mark the extruded strip at a location where the processing unit 112 detects the defect present in extruded strip 102.

In another example, the defect detection system 100 includes an operator interface device electrically connected to the processing unit. The operator interface device may be a liquid crystal display, light-emitting diode display, segment display, or other digital display device. The operator interface device may be configured to display the thermal map of the surface of the extruded strip. The operator interface device may also be configured to display the temperature profile of the extruded strip. In other examples, the operator interface device may be configured to display the presence of a defect in the extruded strip, and/or a location of the defect in the extruded strip. Use of an operator interface device enables an operator to visually monitor the thermal map, temperature profile, or other data outputs from the processing unit. This permits an operator to better understand whether the manufactured extruded strip is conforming to manufacturing specifications. It also enables the operator to configure, troubleshoot, or otherwise monitor the manufacturing of the extruded strip 102 and defect detection system 100.

As described, because the rubber material 106 and the plurality of cords 104 are at relatively different temperatures, the defect detection system 100 may detect the presence of a defect is present in extruded strip 102 by determining whether a temperature is outside of a tolerance range. For example, if there is an absence of rubber material 106 present in extruded strip 102, then the thermal imaging sensor 110 may detect surface temperatures at or near the location of missing rubber material that is lower than it otherwise would in a properly functioning manufacturing process. This is because there will be less rubber material at an elevated temperature, lowering the equilibrium temperature of the extruded strip at or near that location. In another example, if there is one or more damaged, discontinuous, i.e., broken, or missing plurality of cords 104, then the thermal imaging sensor 110 may detect surface temperatures at or near the location of missing cord that is higher than it otherwise would in a properly functioning manufacturing process. This is because there will be less cord material absorbing heat from the relatively higher temperature rubber material, raising the equilibrium temperature of the extruded strip at or near that location.

Use of a thermal imaging sensor and processing unit to detect temperature differentials of the extruded strip enables the defect detection system to determine whether there is a defect present in the extruded strip. This system may help prevent an excess of defective product from being manufactured prior to detecting the presence of a defect. Because the thermal imaging sensor 110 and processing unit 112 are located relatively close to strip extruder 108, the defect detection system 100 can determine the presence of a defect before a substantial portion of defective product is extruded. This helps reduce manufacturing waste of a defective product. It also helps prevent a defective extruded strip from being built into a final tire assembly. If a defective extruded strip is built into a final tire assembly, the whole tire assembly may have to be scrapped, leading to wasted costs.

Use of a thermal imaging sensor and processing unit to detect defects in an extruded strip can be implemented with a wide variety of cord materials, colors, and sizes, rubber materials, and/or different extruded strip manufacturing specifications, such as different widths, thicknesses, cord densities, and the like. Defect detection system 100 may detect defects in the production of an extruded strip of a variety of different materials of the plurality of cords 104. For example, in some manufacturing processes, the plurality of cords 104 may be composed of a metallic compound, such as steel, or textile material, such as polyester, nylon, aramid, or any other suitable material. Accordingly, the plurality of cords 104 may be a variety of different colors. The defect detection system 100 may also detect defects in the production of an extruded strip of a variety of different rubber formulations. Since the defect detection system 100 is configured to determine a temperature profile of the extruded strip and determine whether a temperature differential exists between the temperature profile and the average temperature along the profile line, the system may detect a variety of defects under a wide variety of manufacturing conditions. Further, while the embodiments discussed herein generally relate to one or more cords surrounded by an extruded material, the aspects herein may be used to detect defects (or other characteristics detectable via temperature analysis) whenever two distinct materials with a temperature differential are combined during an extruding or joining process.

By way of a non-limiting example, the defect detection system may be used to detect defects in the extrusion of plastics onto another material, such as fibers, metals, etc. The defect detection system utilizes a thermal imaging sensor to detect a plurality of surface temperatures on a surface of a merged material. The merged material may be formed by combining a first material and a second material together to form a single, combined structure. Prior to forming the merged material, the first material may have a higher temperature relative to the second material. When the two materials are merged, the resulting merged material may begin to reach an equilibrium temperature. The thermal imaging sensor of the defect detection system may detect a plurality of surface temperatures on the surface of the resulting merged material. As discussed previously with reference to FIGS. 1 and 2, a processing unit may generate a thermal map based on the plurality of surface temperatures, calculate various thermal metrics, and determine the presence of a defect in the resulting merged material.

Figure 3:
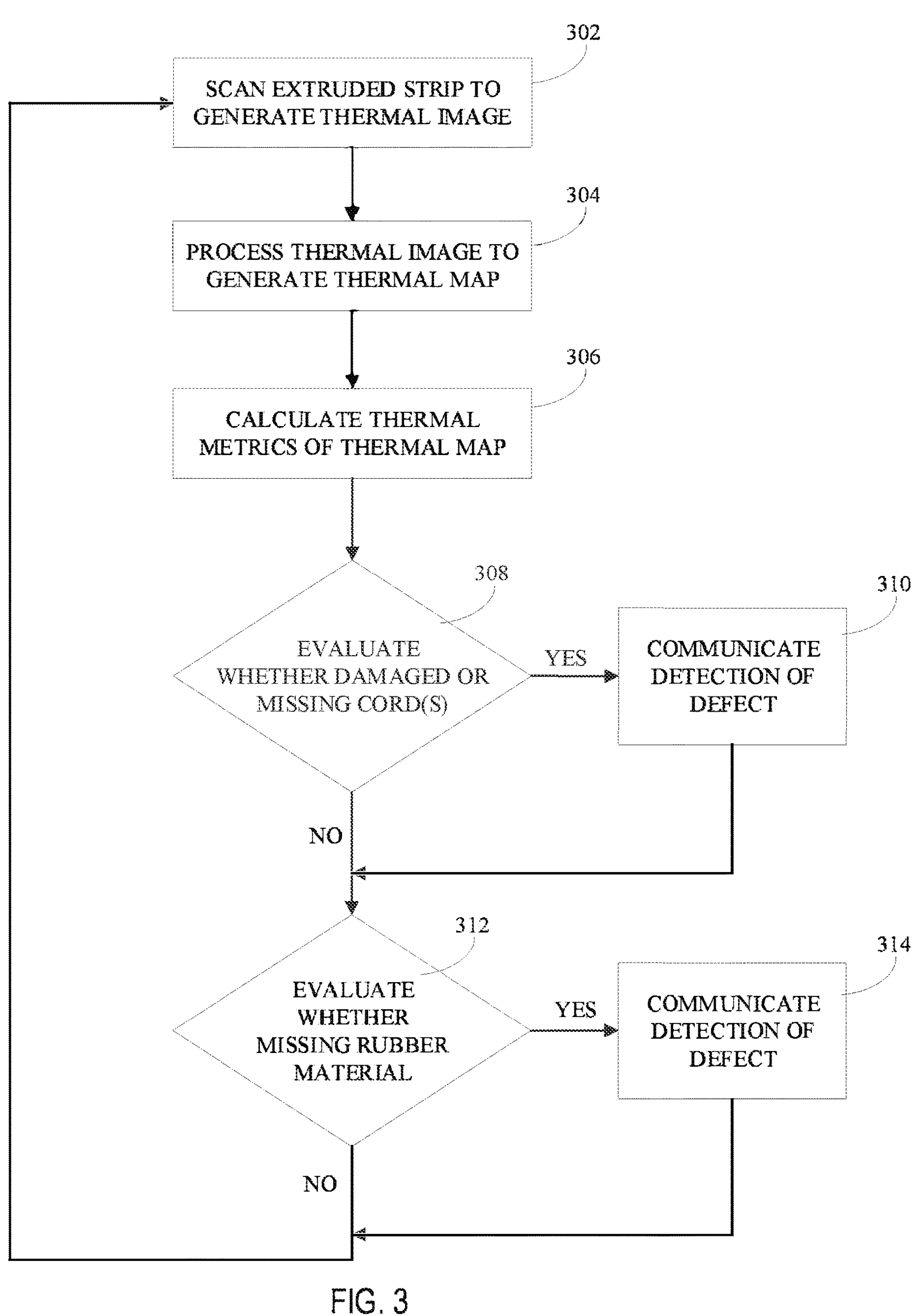
FIG. 3 is a flow diagram illustrating an example method for detecting a defect in an extruded strip.

FIG. 3 is a flow diagram illustrating an example embodiment of a method for detecting a defect in an extruded strip in the system of FIG. 1. As described with reference to FIG. 1, the defect detection system may be used to detect the presence of a defect in an extruded strip using a thermal imaging sensor. Accordingly, at 302, a thermal imaging sensor may be used to scan an extruded strip to generate a thermal image of an area of the extruded strip. As described previously, the thermal imaging sensor may detect the thermal radiation emitted by the extruded strip to determine a plurality of surface temperatures on a surface of the extruded strip.

The thermal image may then be processed to generate a thermal map at 304. As described previously with respect to FIG. 1, the thermal image may be filtered to reduce possible noise of the thermal image. Doing so may reduce any anomalies that are present in the thermal image of the extruded strip to more accurately reflect the true surface temperatures of the extruded strip. The thermal map may be a two-dimensional array of surface temperatures of a portion of the extruded strip.

Based on the thermal map of the extruded strip, at 306, the processing unit may calculate thermal metrics of the thermal map. For example, an average temperature of the thermal map may be calculated. In some examples, the average temperature may be calculated based on the entire thermal map or a two-dimensional portion of the thermal map. In some examples, the average temperature may be calculated along a single line of the thermal map, such as the series of points corresponding to the portion of the length of extruded strip, or the series of points corresponding to the width of the extruded strip. The average temperature may also be calculated based on a combination of any of these methods. Additionally, a standard deviation of the thermal map may be calculated. The standard deviation, may be calculated based on the entire thermal map, two-dimensional portion of the thermal map, or along a single line of the thermal map. As described with respect to the average temperature, the standard deviation may be calculated based on any of these methods individually, or in combination. Other thermal metrics including the maximum, minimum, mean, median, and/or range may also be calculated.

Based on the calculated thermal metrics, the processing unit may evaluate whether damaged or missing cords are present in the extruded strip at 308. Evaluating the thermal map is shown in further detail in FIG. 4 and described below. If the processing unit determines that there is a damage or missing cord in the extruded strip, it may communicate the detection of a defect in the extruded strip at 310. As described in further detail with reference to FIG. 1, the processing unit may communicate with one or more devices and stop the production of the extruded strip, and/or alert an operator through a variety of additional external devices such as turning on an alarm or illuminating an indicator light.

Figure 4:
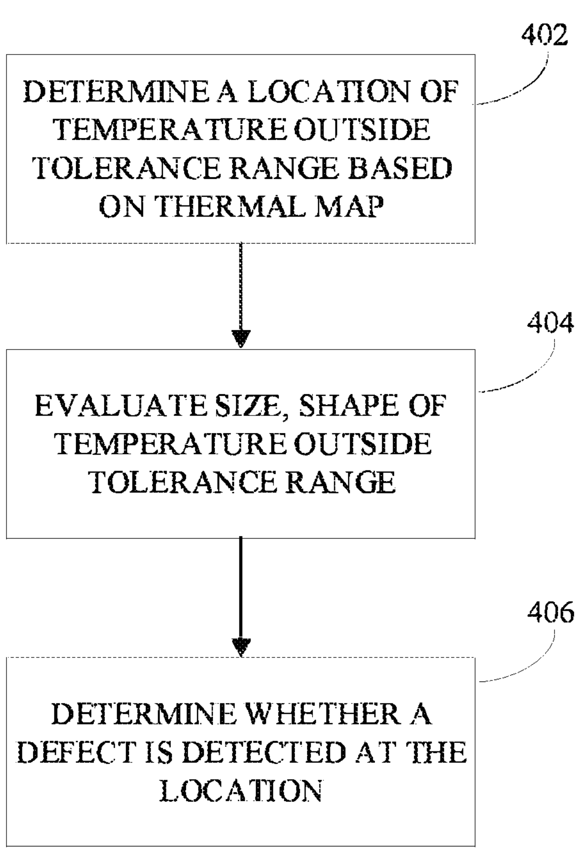
FIG. 4 is a flow diagram of an example method of evaluating whether a defect is present in an extruded strip.

Based on the calculated thermal metrics, the processing unit may additionally evaluate whether there is missing rubber material from the extruded strip at 312. This evaluation may be performed as shown in FIG. 4 and as described in further detail below. If the processing unit determines there is missing rubber in the extruded strip, it may communicate the detection of a defect in the extruded strip at 314.

In some examples, evaluating whether there is missing rubber material from the extruded strip at 312 may be done prior to evaluating whether damaged or missing cords are present in the extruded strip at 308. In other examples, these steps may be combined and performed concurrently. It should also be appreciated that the order of other steps may be altered or varied are within the scope of the present description.

FIG. 4 is a flow diagram of an example method of evaluating whether a thermal defect is present in the extruded strip in the defect detection system, and as performed at step 308 and/or step 312. Based on the series of temperature data points of the thermal map, the processing unit may determine a location where the temperature is outside of a tolerance range at 402. As described previously with reference to FIG. 1, the tolerance range may be a specific temperature range or standard deviation level. The tolerance range may be a static, predetermined value. This value may be based on laboratory, trial, or other manufacturing validation testing. Alternatively, the tolerance range may be a dynamic value which changes based on various properties, for example, thermal conductivity, material type, material quantity, temperature prior to extrusion, or other properties of the rubber material and plurality of cords, and/or the extrusion rate, volume or other manufacturing conditions. In this way, defects may be detected under a wide variety of manufacturing conditions and operations. The tolerance range may also be based on other calculated metrics of the thermal map, or may be a combination of the calculated metrics. For example, the tolerance range may be based on a calculated formula such as the difference between the maximum and minimum temperatures of the thermal map divided by some defined quantity, or standard deviation divided by the median temperature. Accordingly, such tolerance ranges may be dynamic and inherently account for the current manufacturing operation conditions.

At 404, the processing unit may evaluate the size and/or shape of the temperature outside of the range tolerance. By doing so, the processing unit may determine that the temperature outside of the tolerance range is a single data point of the two-dimensional thermal map, or may determine that multiple temperatures are outside of the tolerance range. If multiple temperatures are near each other in the two-dimensional thermal map, the processing unit may consider them to be together and determine a shape of the temperatures that are outside of the tolerance range.

At 406, the processing unit may determine that a defect is detected at the location. The processing unit may determine this based on the size and shape of temperatures that are outside of the tolerance range. For example, the processing unit may determine that a defect is not present if the number of data points with a temperature outside of the tolerance range is below a certain value. The data points with a temperature outside of the tolerance range may be due to a measurement and processing error rather than a defect in the extruded strip. But if sufficient data points have a temperature outside of the tolerance range, the processing unit may determine that a defect is detected at the location of the extruded strip. As described with reference to FIGS. 1 and 3, the processing unit may then communicate the presence of a defect in the extruded strip.

The defect detection system may detect the presence of defects in an extruded strip soon after the plurality of cords and rubber material are joined/combined by taking advantage of the temperature differential of the materials. This can help reduce manufacturing waste and increase quality control of the produced extruded strip. This system may be implemented for a wide variety of materials, has a small operational footprint, and may be implemented in already-existing manufacturing operations with minimal modifications.

While various embodiments have been described, it will be apparent to those of ordinary skill in the art that many more embodiments and implementations are possible. Accordingly, the embodiments described herein are examples, and not the only possible embodiments and implementations within the scope of this description.

Having described various aspects of the subject matter above, additional disclosure is provided below that may be consistent with the claims originally filed with this disclosure. In describing this additional subject matter, reference may be made to the previously described figures.

One general aspect includes a defect detection system for use with a strip extruder, a thermal imaging sensor positioned to detect a plurality of surface temperatures on a surface of an extruded strip as the extruded strip exits the strip extruder, where the extruded strip may include a rubber material surrounding a plurality of cords. The defect detection system also includes a processing unit electrically connected to the thermal imaging sensor, where the processing unit is configured to generate a thermal map of an area of the surface of the extruded strip based on the plurality of surface temperatures detected by the thermal imaging sensor, where the processing unit is further configured to determine whether the plurality of surface temperatures are outside a tolerance range, indicating a presence of a defect.

Implementations of this general aspect may incorporate one or more of the following features in this paragraph. The processing unit may be further configured to determine the plurality of surface temperatures lower than the tolerance range indicates the presence of the defect is due to an absence of the rubber material of the extruded strip. The processing unit may be further configured to determine the plurality of surface temperatures higher than the tolerance range indicates the presence of the defect is due to a damaged or a missing one or more of the plurality of cords of the extruded strip. The processing unit may be further configured to calculate thermal metrics based on the thermal map and to calculate the tolerance range based on the thermal metrics. The calculated thermal metrics may include at least one of the following: average, minimum, maximum, mean, median, range, or standard deviation. A first thermal imaging sensor may be positioned above a top surface of the extruded strip, and where a second thermal imaging sensor is positioned below a bottom surface of the extruded strip. An audio output device may be configured to generate an audible tone when the processing unit detected the presence of the defect. A light-emitting device may be configured to generate a visual indicator when the processing unit detected the presence of the defect. A marking device may be configured to mark the extruded strip at a location where the processing unit detected the presence of the defect. An operator interface device may be configured to display the thermal map. The data storage device may be configured to store the thermal map. The processing unit may be further configured to determine a number of the plurality of cords not present in the extruded strip. The plurality of cords of the extruded strip may be made of a metallic material. The plurality of cords of the extruded strip may be made of a nylon material. The plurality of cords of the extruded strip may be made of a textile material. The thermal imaging sensor may be positioned above a top surface of the extruded strip, and/or the thermal imaging sensor may be positioned below a bottom surface of the extruded strip.

Another general aspect includes a defect detection system, a thermal imaging sensor positioned to detect a plurality of surface temperatures on a surface of a merged structure, the merged structure may include a first material merged with a second material, the first material having a higher temperature relative to the second material prior to being merged. The defect detection system also includes and a processing unit electrically connected to the thermal imaging sensor, where the processing unit is configured to generate a thermal map of an area of the surface of the merged structure based on the plurality of surface temperatures detected by the thermal imaging sensor, and where the processing unit is further configured to determine whether the plurality of surface temperatures are outside a tolerance range, indicating a presence of a defect. Implementations of this general aspect may incorporate one or more of the following features. The processing unit may be further configured to calculate thermal metrics based on the thermal map and to calculate the tolerance range based on the thermal metrics.

Another general aspect includes a defect detection method for use with a strip extruder, detecting a plurality of surface temperatures on a surface of an extruded strip using a thermal imaging sensor, where the extruded strip may include a rubber material surrounding a plurality of cords. The defect detection method also includes processing, by a processing unit electrically connected to the thermal imaging sensor, the plurality of surface temperatures to generate a thermal map of an area of the surface of the extruded strip, calculating, by the processing unit, thermal metrics based on the thermal map, calculating, by the processing unit, a tolerance range based on the thermal metrics, and evaluating, by the processing unit, whether the plurality of surface temperatures are outside the tolerance range, indicating a presence of a defect. Implementations of this general aspect may incorporate one or more of the following features. The method may further include communicating the presence of the defect to an external device. The method may further include determining a size, shape, and location of the presence of the defect.

Another general aspect includes a non-transitory computer-readable medium, including stored computer-readable instructions, the stored computer-readable instructions being loaded and executed by a processor to perform a method of detecting a defect, where the method includes, detecting a plurality of surface temperatures on a surface of an extruded strip using a thermal imaging sensor, where the extruded strip may include a rubber material surrounding a plurality of cords. The method also includes processing, by a processing unit electrically connected to the thermal imaging sensor, the plurality of surface temperatures to generate a thermal map of an area of the surface of the extruded strip, calculating, by the processing unit, thermal metrics based on the thermal map, calculating, by the processing unit, a tolerance range based on the thermal metrics, and evaluating, by the processing unit, whether the plurality of surface temperatures are outside the tolerance range, indicating a presence of a defect.

The invention claimed is:

1. A system for detecting defects in a strip of material, the system comprising:

a thermal imaging sensor positioned to detect a plurality of surface temperatures on a surface of the strip of material, the strip of material comprising a material surrounding a plurality of cords; and a processing unit electrically connected to the thermal imaging sensor, wherein the processing unit is configured to generate a thermal map of an area of the surface of the strip of material based on the plurality of surface temperatures detected by the thermal imaging sensor;

wherein the processing unit is configured to calculate an average surface temperature and a standard deviation;

wherein the processing unit is further configured to determine whether one or more surface temperatures of the plurality of surface temperatures are outside of a tolerance range, which is based on the standard deviation; and wherein determining that the one or more surface temperatures are outside of the tolerance range indicates a defect in the area of the surface represented by the thermal map.

2. The system of claim 1, wherein the processing unit is configured to determine that the one or more surface temperatures are lower than the tolerance range, which indicates that at least some of the material is missing from the strip of material.

3. The system of claim 1, wherein the processing unit is configured to determine that the one or more surface temperatures are higher than the tolerance range, which indicates that at least a portion of a cord of the plurality of cords is missing or damaged.

4. The system of claim 1, wherein the standard deviation is dynamic.

5. The system of claim 1, wherein the thermal imaging sensor comprises a first thermal imaging sensor is positioned above a top surface of the strip of material and a second thermal imaging sensor is positioned below a bottom surface of the strip of material.

6. The system of claim 1, further comprising an audio output device electrically connected to the processing unit, wherein the audio output device is configured to generate an audible tone when the processing unit determines that the one or more surface temperatures are outside the tolerance range.

7. The system of claim 1, further comprising a light-emitting device electrically connected to the processing unit, wherein the light-emitting device is configured to generate a visual indicator when the processing unit determines that the one or more surface temperatures are outside of the tolerance range.

8. The system of claim 1, further comprising a marking device electrically connected to the processing unit, wherein the marking device is configured to mark the strip of material at a location that corresponds with the one or more surface temperatures.

9. The system of claim 1, further comprising an operator interface device electrically connected to the processing unit, wherein the operator interface device is configured to display the thermal map.

10. The system of claim 1, wherein the processing unit is configured to, upon determining that the one or more surface temperatures are outside the tolerance range, send a signal to stop a process for manufacturing the strip of material.

11. The system of claim 1, wherein the processing unit is further configured to determine a number of the plurality of cords not present in the extruded strip of material.

12. The system of claim 1, wherein the plurality of cords comprises a metallic material.

13. The system of claim 1, wherein the plurality of cords comprises a nylon material.

14. The system of claim 1, wherein the plurality of cords comprises a textile material.

15. The system of claim 1, wherein the thermal imaging sensor is positioned above a top surface of the strip of material.

16. The system of claim 1, wherein the thermal imaging sensor is positioned below a bottom surface of the strip of material.

17. A defect detection system, the defect detection system comprising:

a thermal imaging sensor positioned to detect a plurality of surface temperatures on a surface of a merged structure, the merged structure comprising a first material merged with a second material, the first material having a higher temperature relative to the second material prior to being merged; and a processing unit electrically connected to the thermal imaging sensor, wherein, to generate denoised surface temperature data, the processing unit is configured to filter the plurality of surface temperatures, to smooth the plurality of surface temperatures, or to filter and to smooth the plurality of surface temperatures;

wherein the processing unit is configured to generate a thermal map of an area of the surface of the merged structure based on the denoised surface temperature data; and wherein the processing unit is further configured to determine that one or more surface temperatures of the denoised surface temperature data are outside of a tolerance range, indicating a defect in the area of the surface represented by the thermal map.

18. The system of claim 17, wherein the tolerance range comprises a dynamic tolerance range.

19. The system of claim 17, wherein the processing unit is configured to, upon determining that the one or more surface temperatures are outside of the tolerance range, send a signal to stop a process for manufacturing the strip of material.

20. The system of claim 17, wherein the one or more surface temperatures comprise a plurality of surface temperatures that are outside of the tolerance range, and wherein the processing unit is further configured to group the plurality of surface temperatures together relative to the thermal map and determine a shape of the defect.

21. The system of claim 17, wherein the tolerance range comprises a standard deviation of the denoised surface temperature data.

22. A method for detecting a defect in a strip of material, the method comprising:
- detecting a plurality of surface temperatures on a surface of the strip of material using a thermal imaging sensor, the strip of material comprising a material surrounding a plurality of cords;
- processing, by a processing unit electrically connected to the thermal imaging sensor, the plurality of surface temperatures to generate a thermal map of an area of the surface of the strip of material;
- calculating, by the processing unit, thermal metrics based on the thermal map;
- calculating, by the processing unit, a tolerance range based on the thermal metrics; and
- evaluating, by the processing unit, whether the plurality of surface temperatures are outside of the tolerance range, indicating a presence of a defect;
- determining that a first temperature and a second temperature of the plurality of surface temperatures that are outside of the tolerance range; and
- determining a shape of the defect based on the first temperature being near to the second temperature on the thermal map.

23. The method of claim 22, wherein the tolerance range comprises a first standard deviation, and wherein the method further comprises updating the tolerance range based on a second standard deviation that changes relative to the first standard deviation.

24. The method of claim 22, further comprising: sending a signal to stop a process for manufacturing the strip of material.

25. A non-transitory computer-readable medium, including stored computer-readable instructions, the stored computer-readable instructions being loaded and executed by a processor to perform a method of detecting a defect, the method comprising:
- detecting a plurality of surface temperatures on a surface of a strip of material using a thermal imaging sensor, the strip of material comprising a material surrounding a plurality of cords;
- processing, by a processing unit electrically connected to the thermal imaging sensor, the plurality of surface temperatures to generate a thermal map of an area of the surface of the strip of material;
- calculating, by the processing unit, thermal metrics based on the thermal map and a tolerance range based on the thermal metrics; and
- evaluating, by the processing unit, whether the plurality of surface temperatures are outside of the tolerance range, indicating a presence of a defect;
- determining a first temperature and a second temperature of the plurality of surface temperatures that are outside of the tolerance range; and
- determining a shape of the defect based on the first temperature being near to the second temperature on the thermal map.

* * * * *